(12) United States Patent
Biersack

(10) Patent No.: US 8,342,600 B2
(45) Date of Patent: Jan. 1, 2013

(54) CENTRAL FLOOR PART OF A VEHICLE BODY

(75) Inventor: Harald Biersack, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 227 days.

(21) Appl. No.: 12/372,217

(22) Filed: Feb. 17, 2009

(65) Prior Publication Data
US 2009/0206632 A1 Aug. 20, 2009

(30) Foreign Application Priority Data

Feb. 19, 2008 (DE) .......................... 10 2008 009 804

(51) Int. Cl.
*B62D 25/20* (2006.01)
(52) U.S. Cl. .................................. 296/193.07; 296/204
(58) Field of Classification Search ............ 296/193.07, 296/204, 65.03, 187.08
See application file for complete search history.

(56) References Cited

U.S. PATENT DOCUMENTS

| | | | | |
|---|---|---|---|---|
| 4,593,949 A | * | 6/1986 | Tanimoto ...................... | 296/204 |
| 4,898,419 A | * | 2/1990 | Kenmochi et al. ............. | 296/204 |
| 5,112,102 A | | 5/1992 | Wurl | |
| 5,560,674 A | * | 10/1996 | Tazaki et al. .............. | 296/193.01 |
| 5,611,593 A | * | 3/1997 | Fukagawa et al. ............ | 296/204 |
| 6,375,247 B1 | * | 4/2002 | Volz et al. ...................... | 296/66 |
| 7,011,359 B2 | * | 3/2006 | Watanabe et al. ......... | 296/187.08 |
| 7,014,256 B2 | * | 3/2006 | Kamura et al. .......... | 296/193.07 |
| 7,097,238 B2 | * | 8/2006 | Fujita ........................ | 296/193.07 |
| 7,111,900 B2 | * | 9/2006 | Chernoff et al. ......... | 296/193.07 |
| 7,118,167 B2 | * | 10/2006 | Nakamura et al. ....... | 296/193.07 |
| 7,195,306 B2 | * | 3/2007 | Egawa et al. ............. | 296/187.08 |
| 7,244,775 B2 | * | 7/2007 | Ilenda et al. .................. | 523/202 |
| 7,270,366 B2 | * | 9/2007 | Kamura et al. .......... | 296/193.07 |
| 7,407,223 B2 | * | 8/2008 | Ito et al. .................. | 296/193.07 |
| 7,434,871 B2 | * | 10/2008 | Mizuma et al. .......... | 296/193.07 |
| 7,490,892 B2 | * | 2/2009 | Sato ............................ | 296/184.1 |
| 7,527,326 B2 | * | 5/2009 | Egawa et al. ............ | 296/193.07 |

(Continued)

FOREIGN PATENT DOCUMENTS
DE 19748894 A1 5/1999
(Continued)

OTHER PUBLICATIONS

German Patent and Trademark Office Search Report, dated Nov. 14, 2008.

*Primary Examiner* — Glenn Dayoan
*Assistant Examiner* — Gregory Blankenship
(74) *Attorney, Agent, or Firm* — Gerald E. Hespos; Michael J. Porco

(57) ABSTRACT

A central floor part of a floor assembly of a vehicle body is formed as a unipartite cast part which is delimited at the outer side of the body by in each case one sill profile. Alternatively the unipartite cast part can be two cast parts connected to each other by a vehicle tunnel disposed between the inner sides of the two cast parts.

16 Claims, 2 Drawing Sheets

U.S. PATENT DOCUMENTS

| | | | |
|---|---|---|---|
| 7,597,386 B2 * | 10/2009 | Egawa et al. | 296/193.07 |
| 7,637,561 B2 * | 12/2009 | Egawa et al. | 296/193.07 |
| 7,644,978 B2 * | 1/2010 | Tosaka et al. | 296/187.12 |
| 7,695,056 B2 * | 4/2010 | Hanson et al. | 296/204 |
| 7,798,564 B2 * | 9/2010 | Doi et al. | 296/193.07 |
| 7,810,875 B2 * | 10/2010 | Gerisch | 296/193.07 |
| 7,828,370 B2 * | 11/2010 | Ohi et al. | 296/187.08 |
| 2002/0122882 A1 * | 9/2002 | Benson et al. | 427/195 |
| 2002/0145307 A1 * | 10/2002 | Fujita | 296/193 |
| 2003/0005568 A1 * | 1/2003 | Davidson et al. | 29/458 |
| 2005/0247263 A1 * | 11/2005 | Pohl et al. | 118/308 |
| 2009/0206632 A1 * | 8/2009 | Biersack | 296/193.07 |

FOREIGN PATENT DOCUMENTS

| | | |
|---|---|---|
| DE | 19858530 A1 | 6/2000 |
| DE | 19909726 A1 | 9/2000 |
| DE | 10232843 A1 | 2/2004 |
| DE | 102004062933 A1 | 8/2006 |
| EP | 0930221 A2 | 7/1999 |
| GB | 2347653 | 9/2000 |
| GB | 2347653 A | 9/2000 |

* cited by examiner

CENTRAL FLOOR PART OF A VEHICLE BODY

CROSS-REFERENCE TO RELATED APPLICATION

This application claims the priority, under 35 U.S.C. §119, of German application DE 10 2008 009 804.3, filed Feb. 19, 2008; the prior application is herewith incorporated by reference in its entirety.

BACKGROUND OF THE INVENTION

Field of the Invention

The invention relates to a central floor part of a floor assembly of a vehicle body.

Published, non-prosecuted German patent application DE 10 2004 062 933 A1 discloses a floor assembly of a motor vehicle body, having a central floor part which is formed as a closed surface and which is formed from a multiplicity of floor profiles which are arranged adjacent to one another and which point substantially in the vehicle longitudinal direction. The central floor part is adjoined by a vehicle rear end which is formed as an integral cast component, composed of two longitudinal members and two transverse members, as an open support structure.

SUMMARY OF THE INVENTION

It is accordingly an object of the invention to provide a central floor part of a vehicle body that overcomes the above-mentioned disadvantages of the prior art devices of this general type, which is simple to produce.

According to the invention, the central floor part is formed as a unipartite cast part which is delimited at the outer side of the body by in each case one sill profile. A central floor part of this type can be formed, fully cast as an areal part, extremely quickly. A central floor part which corresponds precisely to the respectively desired demands is therefore formed in one single production step. Here, in particular, the central floor part of course contains the floor panel to form a closed surface. Furthermore, the production process always generates central floor parts of uniform design and quality. The front and rear ends of the central floor part as viewed in the vehicle longitudinal direction may be delimited here by a respective transverse member.

It is likewise possible according to the invention for the central floor part to be formed as two cast parts, with each of the two cast parts being delimited by a sill profile at the outer side of the body and either the respective other cast part or a provided vehicle tunnel. This permits the use of relatively small dies in the production process, but is for this reason slightly more difficult to install in the vehicle body. Here, in the event of a vehicle tunnel being present, the central floor part is divided into two equal-sized cast parts. Without a vehicle tunnel of this type, the cast parts may be of the same size, though may of course also be of different sizes. The advantages according to the invention are provided here too, with it again being possible for the front and rear ends of one or both cast parts to be delimited by a respective transverse member.

It is particularly advantageous if the cast part contains at least one transverse seat support, bracket, screw-on point and/or a reinforcement. Here, the advantages of a central floor part produced according to the invention are particularly clear in that it is possible for such components to be integrated in the cast part, as a result of which it is possible for extensive further working steps on the central floor part to be eliminated. This is because a central floor part conventionally has a multiplicity of such components, for example front and/or rear transverse seat supports, various brackets or fastening points for parts to be installed in the region of the floor in the body, and the floor panel itself, including any reinforcements. All of the components are now integrated into a single cast part. Here, it is possible to provide any desired combinations of the individual components. It is of course also possible, in the case of a design of the central floor part as a unipartite cast part, for tunnel panels for the vehicle tunnel to also be integrated in the cast part. Such integrally cast components then no longer need to be fastened to the central floor part by subsequent, further working steps.

For reinforcement, the cast part may have a ribbed structure at least in regions. This permits the use of particularly thinly cast sections of the floor panel, since critical sections may be reinforced in a targeted fashion by corresponding ribs. It is hereby possible to obtain a desired stiffness of the central floor part. Here, the ribbed structure may be provided so as to be locally adapted, for example in the longitudinal and/or transverse direction of the vehicle body, or else obliquely.

In one particularly preferred embodiment, a cast part is provided which is formed from light metal, in particular from magnesium. This results in a particularly light central floor part, with it also being possible for the central floor part to be cast particularly thinly as a result of the use of light metal.

Suitable production processes for casting such large-area, thin and complex cast parts are pressure die casting, tixo-molding or reo-casting. The processes then permit reliable production of a cast part according to the invention.

It is advantageous if the cast part is at least partially coated, in particular powder-coated. This results in a good level of corrosion resistance, in particular with regard to contact corrosion, specifically when using light metal.

Particularly simple integration of a cast part into the vehicle body is permitted by the use of a flange on the cast part at least in sections. A flange of this type, which is provided at the outer edge of the cast part, permits a simple connection of the central floor part to a sill profile or vehicle tunnel by suitable joining processes, for example adhesive bonding, screwing and/or punch riveting.

In addition to the use as a central floor part, it is of course also possible for a cast part according to the invention to be provided as a luggage compartment floor. The advantages according to the invention are also obtained here by providing a fully formed luggage compartment floor part with integrated components such as for example brackets or fastening arrangements. Here, the connection to a sill profile may be realized in a similar manner to the case of the central floor part according to the invention.

Other features which are considered as characteristic for the invention are set forth in the appended claims.

Although the invention is illustrated and described herein as embodied in a central floor part of a vehicle body it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
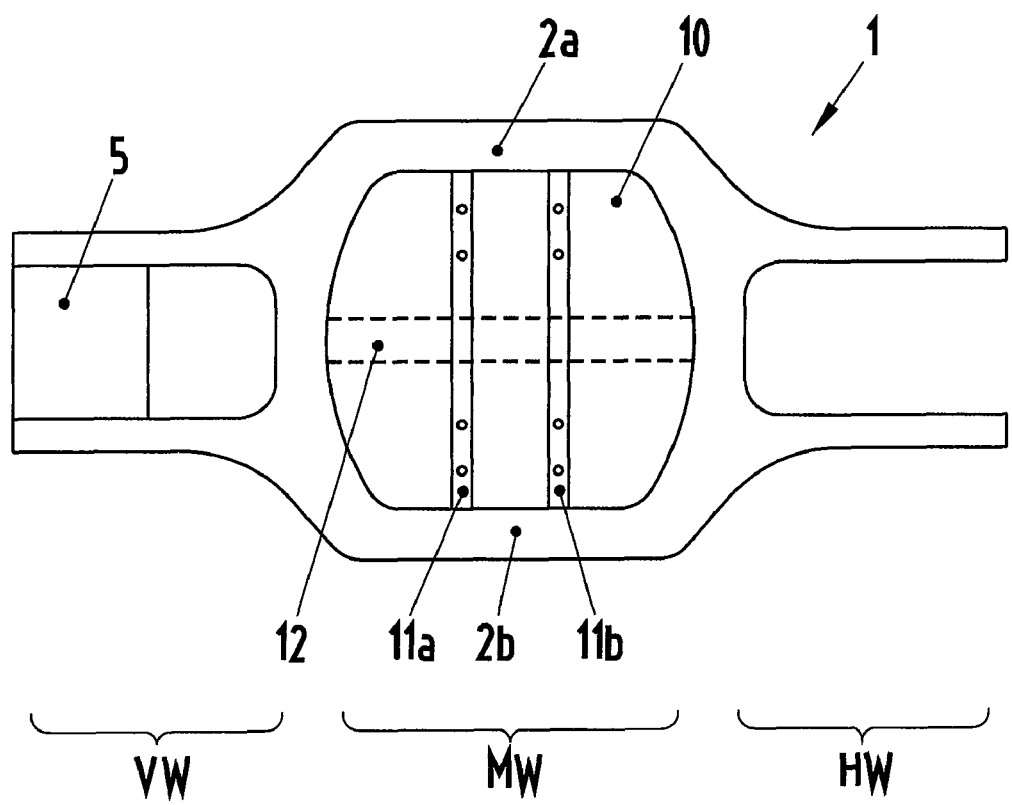
FIG. 1 is a diagrammatic, top view of an arrangement of a central floor part according to the invention.
Figure 2:
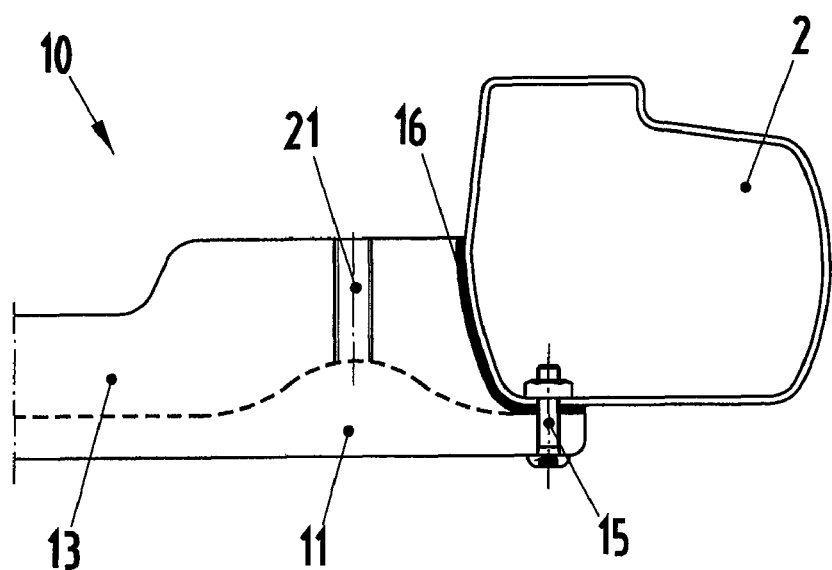
FIG. 2 is a diagrammatic, side view showing a connection of the central floor part according to the invention to a sill profile.

Referring now to the figures of the drawing in detail and first, particularly, to FIG. 1 thereof, there is shown a floor assembly 1 of a vehicle body, having a central floor part 10 according to the invention. Here, the central floor part 10 is disposed between two sill profiles 2a and 2b. Also schematically shown is the position of the central floor part 10 in the vehicle central section MW of the vehicle body, which vehicle central section is adjoined by a vehicle front end VW and a vehicle rear end HW. Since a rear-wheel-drive vehicle is illustrated in the present case, the luggage compartment floor 5 is provided in the region of the vehicle front end VW. The luggage compartment floor 5 may likewise be produced similarly to the central floor part 10 according to the invention. Additionally indicated are an optional vehicle tunnel 12 and front and rear transverse seat supports 11a and 11b for holding fastening points of the vehicle seats. FIG. 2 schematically shows the connection of the central floor part 10 according to the invention to a sill profile 2. For this purpose, a chamfer is provided at the edge of the central floor part 10, which chamfer serves to hold an adhesive 16. The adhesive 16 fixes the sill profile 2. A screw connection 15 is additionally provided between the sill profile 2 and the central floor part 10. Here, the central floor part 10, as a cast part, has an integrally cast rib 13 as a reinforcement. The rib 13 rises up substantially orthogonally on the surface, illustrated by the dashed line, of the floor panel. Also indicated is a transverse seat support 11 with a screw-on point 21 for a vehicle seat.

Figure 3:
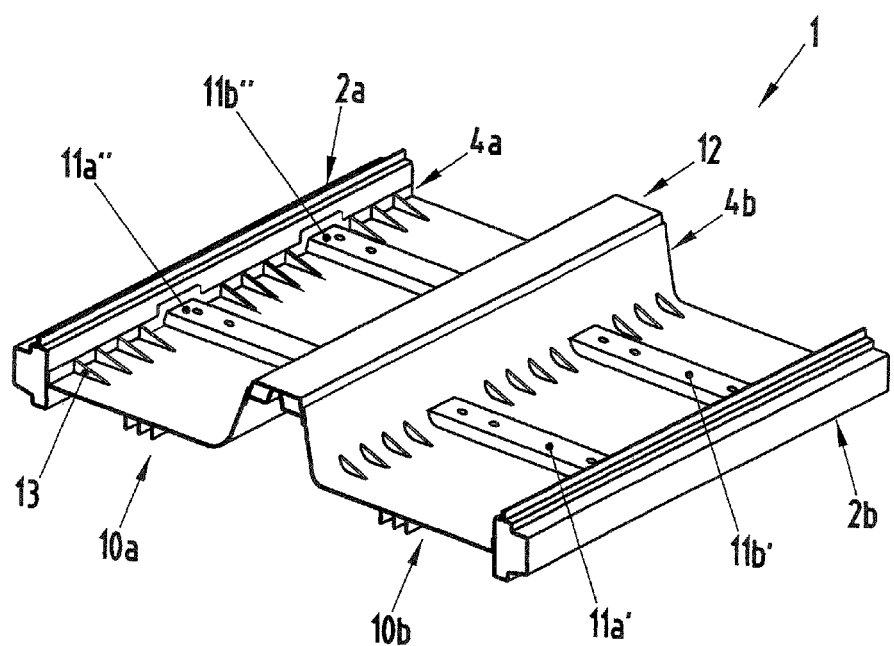
FIG. 3 is a diagrammatic, perspective view of a preferred embodiment of a central floor part as two cast parts.

FIG. 3 illustrates one particularly preferred solution of the central floor part according to the invention as two cast parts. Here, the vehicle body contains two sill profiles 2a, 2b and the vehicle tunnel 12. The parts are produced in each case as extruded profiles for example from aluminum or magnesium. In each case left-hand and right-hand central floor parts, as two cast parts 10a and 10b, extend between the sill profiles 2a, 2b and vehicle tunnel 12. Here, a respective left-hand and right-hand cast part also contains in each case front transverse seat supports 11a' and 11a" and rear transverse seat supports 11b' and 11b". Furthermore, a respective cast part also contains reinforcement ribs 13 which are provided locally at correspondingly suitable points. The left-hand and the right-hand central floor part are formed here in each case as a cast part, with the floor panel, the reinforcement ribs 13, the transverse seat supports 11a' and 11b' and 11a" and 11b" and joint flanges 4a and 4b in each case being cast together as an integral part. The joint flanges 4a—provided in each case at different sides on the left-hand and right-hand central floor parts—are provided here for connecting a central floor part to the sill profile, and the respective joint flanges 4b are provided for connecting a central floor part to the vehicle tunnel. This results in a vehicle body which can be formed entirely from light metal, specifically from light metal extruded profiles for the sill profiles and the vehicle tunnel, and from light metal cast parts for the central floor part.

In the case of a configuration of the central floor part according to the invention as a unipartite cast part which is delimited at the body outer side by in each case one sill profile, the left-hand and the right-hand central floor part 10a and 10b, the transverse seat supports 11a', 11b', 11a" and 11b", the reinforcement ribs 13 and the vehicle tunnel 12 would be formed as a common cast part. For a connection to the sill profile, the one cast part would then have two flanges 4a, since the flanges 4b would of course be eliminated.

The invention claimed is:

1. A floor assembly of a vehicle body, comprising:
   transversely spaced sill profiles running in a longitudinal direction of the vehicle body; and
   a unitary cast part extending between the sill profiles and having outer flanges joined respectively in substantially face to face relationship with said sill profiles, said cast part being formed from magnesium and having a central tunnel, left and right central floor parts extending respectively from the outer flanges to the central tunnel, transverse seat supports projecting up from the central floor parts and extending transverse to the longitudinal direction across the respective central floor parts between said central tunnel and the respective outer flanges at the corresponding sill profiles, outer reinforcement ribs projecting up from the central floor parts and extending between the respective central floor parts and the outer flanges and inner reinforcement ribs spaced from the outer reinforcement ribs and projecting up from the central floor parts, the inner reinforcement ribs extending between the central floor parts and said central tunnel.

2. The floor assembly according to claim 1, wherein each of the transverse seat supports of said cast part contains at least one screw-on point for attaching a seat.

3. The floor assembly according to claim 1, wherein said cast part has the reinforcement ribs at least in regions forward and rearward of the transverse seat supports.

4. The floor assembly according to claim 1, wherein said cast part is at least partially powder-coated.

5. The floor assembly according to claim 1, further comprising adhesive securing the outer flanges to the sill profiles.

6. The floor assembly according to claim 5, further comprising at least one screw connection between the cast parts and the sill profiles.

7. The floor assembly according to claim 1, wherein the transverse seat supports comprise front and rear transverse seat supports on each of the central floor parts.

8. The floor assembly of claim 7, wherein the outer reinforcement ribs comprise at least one outer reinforcement rib between the front and rear transverse seat supports and the inner reinforcement ribs comprise at least one inner reinforcement rib between the front and rear transverse seat supports.

9. A floor assembly of a vehicle body, comprising:
   left and right sill profiles running in a longitudinal direction of the vehicle body;
   a tunnel extending in the longitudinal direction of the vehicle body at a location intermediate the sill profiles; and
   left and right unitary cast parts extending respectively between the tunnel and said left and right sill profiles, said cast parts being formed from magnesium and each having a central floor part, an outer flange in face to face relationship to the respective sill profile, and inner flange in face-to-face relationship to the tunnel, at least one transverse seat support running across the respective central floor part from the inner flange to the outer flange and transverse to the sill profiles, outer reinforcement ribs projecting up from the central floor part and extending from the central floor part to the outer flange and inner reinforcement ribs spaced from the outer reinforcement ribs and projecting up from the central floor part, the inner reinforcement ribs extending from the central floor part to the inner flange.

10. The floor assembly according to claim 9, wherein the at least one transverse seat support comprises two transverse seat supports on each of the cast parts, each of the transverse seat supports of each of said cast parts contains a screw-on point for attaching a seat.

11. The floor assembly according to claim 9, wherein the at least one transverse seat support comprises two transverse seat supports on each of the cast parts, each of said cast parts has the reinforcement ribs at least in regions forward and rearward of the transverse seat supports.

12. The floor assembly according to claim 9, wherein said cast parts are at least partially powder-coated.

13. The floor assembly according to claim 9, further comprising adhesive securing the outer flanges to the sill profiles.

14. The floor assembly according to claim 13, further comprising at least one screw connection between the cast parts and the sill profiles.

15. The floor assembly according to claim 9, wherein the at least one transverse seat supports comprises front and rear transverse seat supports on each of the central floor parts.

16. The floor assembly of claim 15, wherein the outer reinforcement ribs comprise at least one outer reinforcement rib between the front and rear transverse seat supports and the inner reinforcement ribs comprise at least one inner reinforcement rib between the front and rear transverse seat supports.

* * * * *